United States Patent
Zhao et al.

(10) Patent No.: US 11,936,027 B2
(45) Date of Patent: Mar. 19, 2024

(54) CASE OF BATTERY, BATTERY, POWER CONSUMPTION DEVICE, AND METHOD AND DEVICE FOR PRODUCING BATTERY

(71) Applicant: JIANGSU CONTEMPORARY AMPEREX TECHNOLOGY LIMITED, Jiangsu (CN)

(72) Inventors: Fenggang Zhao, Jiangsu (CN); Jiarong Hong, Jiangsu (CN); Xiaoteng Huang, Jiangsu (CN); Wenli Wang, Jiangsu (CN); Cheng Xue, Jiangsu (CN); Haiqi Yang, Jiangsu (CN); Langchao Hu, Jiangsu (CN)

(73) Assignee: JIANGSU CONTEMPORARY AMPEREX TECHNOLOGY LIMITED, Jiangsu (CN)

( * ) Notice: Subject to any disclaimer, the term of this patent is extended or adjusted under 35 U.S.C. 154(b) by 653 days.

(21) Appl. No.: 17/134,490

(22) Filed: Dec. 27, 2020

(65) Prior Publication Data
US 2022/0123390 A1    Apr. 21, 2022

Related U.S. Application Data

(63) Continuation of application No. PCT/CN2020/121991, filed on Oct. 19, 2020.

(51) Int. Cl.
| | |
|---|---|
| *H01M 10/6569* | (2014.01) |
| *H01M 10/0525* | (2010.01) |
| *H01M 10/625* | (2014.01) |
| *H01M 10/6551* | (2014.01) |
| *H01M 50/204* | (2021.01) |
| *H01M 50/249* | (2021.01) |
| *H01M 50/30* | (2021.01) |
| *H01M 50/317* | (2021.01) |

(52) U.S. Cl.
CPC ... *H01M 10/6569* (2015.04); *H01M 10/0525* (2013.01); *H01M 10/625* (2015.04); *H01M 10/6551* (2015.04); *H01M 50/204* (2021.01); *H01M 50/249* (2021.01); *H01M 50/317* (2021.01); *H01M 50/394* (2021.01); *H01M 2220/20* (2013.01)

(58) Field of Classification Search
None
See application file for complete search history.

(56) References Cited

U.S. PATENT DOCUMENTS

2013/0111939 A1    5/2013    Yan

FOREIGN PATENT DOCUMENTS

| CN | 102656738 A | 9/2012 |
|---|---|---|
| CN | 207441811 U | 6/2018 |
| CN | 207967074 U | 10/2018 |
| CN | 109244592 A | 1/2019 |
| CN | 110868645 A | 3/2020 |
| DE | 10 2015 111 747 A1 | 1/2017 |
| JP | 2006351245 A | 12/2006 |
| JP | 2019536214 A | 12/2019 |
| KR | 20170044473 A | 4/2017 |
| KR | 20180088189 A | 8/2018 |
| WO | 2006098130 A1 | 9/2006 |
| WO | 2020143173 A1 | 7/2020 |

OTHER PUBLICATIONS

Extenede European Search Report dated Feb. 10, 2022 received in European Patent Application No. EP 20824408.7.
Notice of Reasons for Refusal dated Oct. 30, 2023 received in Japanese Patent Application No. JP 2023-504838.
Request for the Submission of an Opinion dated Aug. 1, 2023 received in Korean Patent Application No. KR 10-2023-7001872.

*Primary Examiner* — Anca Eoff
(74) *Attorney, Agent, or Firm* — Scully, Scott, Murphy & Presser, P.C.

(57) ABSTRACT

Embodiments of the present application provide a case for a battery, a battery, a power consumption device, and a method and device for producing a battery. The case includes: a thermal management component configured to adjust temperature of a battery cell accommodated in the case; a first wall provided with a through hole, the through hole being configured to communicate a gas inside and outside the case; and a condensing component attached to the thermal management component, the condensing component being configured to shield the through hole so as to condense a gas flowing into the inside of the case through the through hole. According to the technical solutions of the embodiments of the present application, the safety of the battery can be enhanced.

16 Claims, 9 Drawing Sheets

CASE OF BATTERY, BATTERY, POWER CONSUMPTION DEVICE, AND METHOD AND DEVICE FOR PRODUCING BATTERY

CROSS-REFERENCE TO RELATED APPLICATIONS

This application is a continuation of International Application No. PCT/CN2020/121991, filed on Oct. 19, 2020, the disclosure of which is hereby incorporated by reference in its entirety.

TECHNICAL FIELD

Embodiments of the present application relate to the field of batteries, and more particularly, to a case for a battery, a battery, a power consumption device, and a method and device for producing a battery.

BACKGROUND

Energy saving and emission reduction is the key to the sustainable development of an automobile industry. In this case, electric vehicles have become an important part of the sustainable development of the automobile industry because of their advantages of energy saving and environmental friendliness. For the electric vehicles, battery technology is an important factor related to their development.

In the development of the battery technology, in addition to improving the performance of a battery, safety is also a problem that cannot be ignored. If the safety of the battery cannot be ensured, the battery cannot be used.

When a battery is in a high-temperature and high-humidity environment, condensate is likely to be produced in a case of the battery, causing safety hazards and affecting the safety of the battery. Therefore, how to enhance the safety of the battery is an urgent technical problem to be solved in the battery technology.

SUMMARY

Embodiments of the present application provide a case for a battery, a battery, a power consumption device, and a method and device for producing a battery, which can enhance the safety of the battery.

In a first aspect, provided is a case for a battery, including: a thermal management component configured to adjust temperature of a battery cell accommodated in the case; a first wall provided with a through hole, the through hole being configured to communicate a gas inside and outside the case; and a condensing component attached to the thermal management component, the condensing component being configured to shield the through hole so as to condense a gas flowing into the inside of the case through the through hole.

According to a technical solution of an embodiment of the present application, a condensing component is utilized to be attached to a thermal management component, and shield a through hole that communicates a gas inside and outside a case so as to condense a gas flowing into the inside of the case through the through hole. In this way, condensate can be enabled to be far away from an electrical connection region in the case. Therefore, the safety of a battery can be enhanced.

In some embodiments, the condensing component is disposed on an inner surface of the case.

In some embodiments, the thermal management component intersects with the first wall, a first portion of the condensing component extends along the thermal management component to be attached to the thermal management component, and a second portion of the condensing component extends along the first wall to shield the through hole.

In some embodiments, the condensing component includes a cover-like structure, and the cover-like structure shields the through hole.

In some embodiments, the cover-like structure is attached to a region of the first wall around the through hole, and has a first opening for the gas to flow into the case.

In some embodiments, the first opening is disposed in a first direction of the cover-like structure, and the first direction is an opposite direction of a gravity direction.

By shielding a through hole by a cover-like structure, a gas reaching the through hole can be condensed by the cover-like structure, thereby improving a condensation effect. The condensed gas can enter the inside of a case through a first opening of the cover-like structure to maintain balance of pressure inside and outside the case.

In some embodiments, the first opening corresponds to a connection of a pipeline of a fire-fighting system in the case, and the first opening is further configured to collect a fluid leaked at the connection when the fluid is leaked at the connection.

In this way, it is possible to avoid safety hazards caused by spreading of a fluid leaked at a connection in a case.

In some embodiments, the cover-like structure is hemispherical and square.

In some embodiments, the condensing component further includes a flow channel, and the flow channel is configured to guide condensate in the cover-like structure to the thermal management component.

In some embodiments, portions of the condensing component on both sides of the flow channel are attached to the thermal management component or the first wall.

In some embodiments, the cover-like structure has a second opening corresponding to the flow channel, and the second opening is configured to guide the condensate in the cover-like structure to the flow channel.

In some embodiments, the second opening is disposed in a second direction of the cover-like structure, and the second direction is a gravity direction.

In some embodiments, a one-way gravity valve is disposed on the thermal management component, and the one-way gravity valve is configured to discharge the condensate in the flow channel from the case when the gravity of the condensate in the flow channel reaches a threshold.

Through a cover-like structure and a flow channel, condensate or a fluid leaked at a connection of a fire-fighting pipeline can be guided to a thermal management component. Through a one-way gravity valve, when there are a lot of condensate or leaked fluids, they can be discharged from a case, so as to ensure the safety of a battery.

In some embodiments, the case further includes: a pressure balancing mechanism configured to balance pressure inside and outside the case.

In some embodiments, the first wall includes a first sub-wall and a second sub-wall, where a cavity is formed between the first sub-wall and the second sub-wall, the first sub-wall is an inner wall of the case, the second sub-wall is an outer wall of the case, and the through hole is disposed on the first sub-wall.

In some embodiments, the pressure balancing mechanism is disposed on the second sub-wall, and a gas flowing into the cavity from the outside of the case through the pressure balancing mechanism flows into the inside of the case through the through hole.

In some embodiments, the first wall is configured to condense the gas flowing into the cavity through the pressure balancing mechanism in the cavity.

A first sub-wall and a second sub-wall may form a cavity. In this way, after a gas outside a case enters the cavity, it will condense in the cavity to form condensate in the cavity; moreover, due to the existence of the cavity, gas condensing space is enlarged and a condensation effect is further improved.

In some embodiments, an axis of the through hole does not overlap with an axis of the pressure balancing mechanism.

In some embodiments, an orthographic projection of the through hole on the second sub-wall does not overlap with the pressure balancing mechanism.

Staggered arrangement of a through hole and a pressure balancing mechanism can extend the channel of a gas in a cavity and improve a condensation effect on the gas.

In some embodiments, a fins is disposed in the cavity, and the fin is configured to condense the gas flowing into the cavity through the pressure balancing mechanism.

By disposing a fin, a condensation area of a gas can be enlarged, thereby improving a condensation effect on the gas.

In some embodiments, the fin is disposed in a gas channel from the pressure balancing mechanism to the through hole.

In this way, when a gas flows from a pressure balancing mechanism to a through hole, it will contact fin and be condensed by the fin, which improves a condensation effect.

In some embodiments, the fin is fixed on the first sub-wall.

In some embodiments, the fin is parallel to a connecting line from a center of the pressure balancing mechanism to a center of the through hole.

In this way, not only can a condensation effect of fin be achieved, but also the fin can be used to guide air flow without obstructing the flow of a gas, so as to ensure balance of pressure inside and outside a case.

In a second aspect, provided is a battery, including: a plurality of battery cells; and the case in the first aspect, where the plurality of battery cells are accommodated in the case.

In a third aspect, provided is a power consumption device, including: the battery in the second aspect.

In some embodiments, the power consumption device is a vehicle, a ship or a spacecraft.

In a fourth aspect, provided is a method for producing a battery, including: providing a plurality of battery cells; providing a case, the case including: a thermal management component configured to adjust temperature of the battery cell accommodated in the case; a first wall provided with a through hole, the through hole being configured to communicate a gas inside and outside the case; and a condensing component attached to the thermal management component, the condensing component being configured to shield the through hole so as to condense a gas flowing into the inside of the case through the through hole; and accommodating the plurality of battery cells in the case.

In some embodiments, the thermal management component intersects with the first wall, a first portion of the condensing component extends along the thermal management component to be attached to the thermal management component, and a second portion of the condensing component extends along the first wall to shield the through hole.

In some embodiments, the condensing component includes a cover-like structure, and the cover-like structure shields the through hole.

In some embodiments, the cover-like structure is attached to a region of the first wall around the through hole, and has a first opening for the gas to flow into the case.

In some embodiments, the condensing component further includes a flow channel, and the flow channel is configured to guide condensate in the cover-like structure to the thermal management component.

In a fifth aspect, provided is a device for producing a battery, including modules for executing the method in the foregoing fourth aspect.

BRIEF DESCRIPTION OF THE DRAWINGS

The accompanying drawings described herein are intended to provide a further understanding of the present application, which constitute a part of the present application. The illustrative embodiments of the present application and the description thereof are for explaining the present application and do not constitute an undue limitation of the present application. In the drawings.

DESCRIPTION OF EMBODIMENTS

Figure 1:
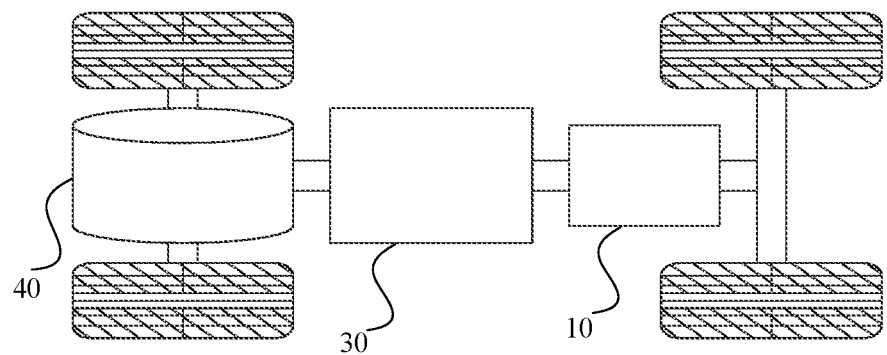
FIG. 1 is a schematic diagram of a vehicle according to an embodiment of the present application.

To make the objectives, technical solutions and advantages of the embodiments of the present application clearer, the following clearly describes the technical solutions in the embodiments of the present application with reference to the accompanying drawings in the embodiments of the present application. Apparently, the described embodiments are merely some but not all of the embodiments of the present application. All the other embodiments obtained by those of ordinary skill in the art based on the embodiments of the present application without any inventive effort shall fall within the scope of protection of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the accompanying drawings are intended to cover non-exclusive inclusions. The terms "first", "second" and the like in the specification and the claims of the present application as well as the above drawings are used to distinguish different objects, rather than to describe a specific order or primary-secondary relationship.

The word "embodiments" referred to in the present application means that the descriptions of specific features, structures, and characteristics in combination with the embodiments are comprised in at least one embodiment of the present application. The phrase at various locations in the specification does not necessarily refer to the same embodiment, or an independent or alternative embodiment exclusive of another embodiment. Those skilled in the art understand, in explicit and implicit manners, that an embodiment described in the present application may be combined with another embodiment.

In the description of the present application, it should be noted that, unless explicitly specified and defined otherwise, terms "installation", "interconnection", "connection" and "attachment" should be understood broadly, for example, they may either be a fixed connection, or a detachable connection, or an integrated connection; and they may either be a direct connection, or an indirect connection through an intermediary, and they may be an internal connection between two elements. Those of ordinary skill in the art may understand specific meanings of the above terms in the present application according to specific conditions.

In the present application, the term "and/or" is only an association relation describing associated objects, which means that there may be three relations, for example, A and/or B may represent three situations: A exists alone, both A and B exist, and B exists alone. In addition, the character "/" in the present application generally indicates that the associated objects before and after the character are in an "or" relation.

In the present application, "a plurality of" means two or more (including two), similarly, "a plurality of groups" means two or more groups (including two groups), and "a plurality of sheets" means two or more sheets (including two sheets).

In the present application, battery cells may include lithium-ion secondary batteries, lithium-ion primary batteries, lithium-sulfur batteries, sodium/lithium-ion batteries, sodium-ion batteries or magnesium-ion batteries, etc., which is not limited by the embodiments of the present application. The battery cells may be cylindrical, flat, cuboid, or in another shape, which is not limited by the embodiments of the present application. The battery cells are generally divided into three types according to the way of packaging: cylindrical battery cells, prismatic battery cells and pouch battery cells, which is not limited by the embodiments of the present application.

The battery mentioned in the embodiment of the present application refers to a single physical module that includes one or more battery cells to provide a higher voltage and capacity. For example, the battery mentioned in the present application may include a battery module or a battery pack. The battery generally includes a case for enclosing one or more battery cells. The case can prevent a liquid or other foreign matters from affecting the charging or discharging of the battery cell.

The battery cell includes an electrode assembly and an electrolytic solution, and the electrode assembly is composed of a positive electrode sheet, a negative electrode sheet and an isolation film. The operation of the battery cell mainly relies on the movement of metal ions between the positive electrode sheet and the negative electrode sheet. The positive electrode sheet includes a positive electrode current collector and a positive active material layer. The positive active material layer is coated on a surface of the positive electrode current collector, and the current collector not coated with the positive active material layer protrudes from the current collector coated with the positive active material layer and is used as a positive electrode tab. As an example, in a lithium-ion battery, the material of the positive electrode current collector may be aluminum, and the positive active material may be lithium cobalt oxide, lithium iron phosphate, ternary lithium or lithium manganate, etc. The negative electrode sheet includes a negative electrode current collector and a negative active material layer. The negative active material layer is coated on a surface of the negative electrode current collector, and the current collector not coated with the negative active material layer protrudes from the current collector coated with the negative active material layer and is used as a negative electrode tab. The material of the negative electrode current collector may be copper, and the negative active material may be carbon or silicon, etc. In order to ensure that no fusing occurs when a large current passes, there are a plurality of positive electrode tabs which are stacked together, and there are a plurality of negative electrode tabs which are stacked together. A material of the isolation film may be PP, PE, or the like. In addition, the electrode assembly may be in a winding structure or a laminated structure, and the embodiment of the present application is not limited thereto.

With the development of the battery technology, it is necessary to consider many design factors, such as energy density, cycle life, discharge capacity, charging and discharging rates and other performance parameters. In addition, the safety of the battery should also be considered.

With respect to battery cells, the main safety hazards come from the charging and discharging processes, and a suitable environmental temperature design is also required. In order to effectively avoid unnecessary losses, at least triple protection measures are generally taken for the battery cells. Specifically, the protection measures at least include a switching element, an appropriately selected isolation film material and a pressure relief mechanism. The switching element refers to an element that can stop the charging or discharging of a battery when the temperature or resistance in a battery cell reaches a certain threshold. The isolation film is configured to isolate the positive electrode sheet from the negative electrode sheet and can automatically dissolve micron-sized (or even nanoscale) micropores attached to the isolation film when the temperature rises to a certain value, thus preventing metal ions from passing through the isolation film and terminating the internal reaction of the battery cell.

The pressure relief mechanism refers to an element or component that is actuated when an internal pressure or temperature of the battery cell reaches a predetermined threshold, to relieve the internal pressure or temperature. The threshold design is different according to different design requirements. The threshold may depend on the material of one or more of the positive electrode sheet, the negative electrode sheet, the electrolytic solution and the isolation film in the battery cell. The pressure relief mechanism may take the form of an explosion-proof valve, an air valve, a pressure relief valve or a safety valve, etc., and may specifically adopt a pressure-sensitive or temperature-sensitive element or structure. That is, when the internal pressure or temperature of the battery cell reaches a predetermined threshold, the pressure relief mechanism performs an action or a weakened structure provided in the pressure relief mechanism is damaged, so as to form an opening or channel for relieving the internal pressure or temperature.

The "actuation" mentioned in the present application means that the pressure relief mechanism acts or is activated to a certain state, such that the internal pressure and temperature of the battery cell can be relieved. The action generated by the pressure relief mechanism may include but be not limited to: at least a portion of the pressure relief mechanism being fractured, broken, torn or opened, and so on. When the pressure relief mechanism is actuated, high-temperature and high-pressure substances inside the battery cell are discharged outwards from an actuated position as emissions. In this way, the pressure and temperature in the battery cell can be relieved at a controllable pressure or temperature, thereby avoiding potential, more serious accidents.

The emissions from the battery cell mentioned in the present application include but are not limited to: the electrolytic solution, the dissolved or split positive and negative electrode sheets, fragments of the isolation film, high-temperature and high-pressure gas generated by reaction, flame, etc.

The pressure relief mechanism on the battery cell has an important impact on the safety of the battery. For example, when short circuit, overcharge and other phenomena occur, it may lead to thermal runaway inside the battery cell, resulting in a sudden increase in pressure or temperature. In this case, the internal pressure and temperature can be released outward through the actuation of the pressure relief mechanism, to prevent the battery cell from exploding and catching fire.

In the current design solutions of the pressure relief mechanism, the main concern is to release the high pressure and high heat inside the battery cell, i.e., to discharge the emissions to the outside of the battery cell. The high-temperature and high-pressure emissions are discharged in a direction of the pressure relief mechanism provided in the battery cell, and more specifically, may be discharged in a direction of a region where the pressure relief mechanism is actuated. The strength and destructive power of such emissions may be great, or may even be enough to break through one or more structures in this direction, causing safety problems. In addition, after thermal runaway occurs inside the battery cell, high pressure and high heat inside the battery cell may continue to be generated, resulting in continuous safety hazards.

In view of the foregoing problems, a fire-fighting system may be disposed inside a case of a battery, and a fire-fighting pipeline of the fire-fighting system is disposed above a wall of a battery cell provided with a pressure relief mechanism. When the pressure relief mechanism is actuated, the fire-fighting pipeline discharges a fire-fighting medium, thereby lowering temperature of the emissions discharged from the pressure relief mechanism and reducing the risk resulting from the emissions; and the fire-fighting medium may further flow into the inside of the battery cell through the actuated pressure relief mechanism, thereby further lowering temperature of the battery cell and enhancing the safety of the battery. For example, the emissions discharged from the battery cell when the pressure relief mechanism is actuated may be used to damage the fire-fighting pipeline, so that the fire-fighting medium in the fire-fighting pipeline is discharged.

The fire-fighting pipeline in an embodiment of the present application is configured to accommodate a fire-fighting medium, and the fire-fighting medium here may be a fluid, and the fluid may be a liquid or a gas. In the case where the pressure relief mechanism does not damage the fire-fighting pipeline, the fire-fighting pipeline may not accommodate any substance, but in the case where the pressure relief mechanism is actuated, the fire-fighting medium may be accommodated in the fire-fighting pipeline, for example, the fire-fighting medium may be controlled to enter the fire-fighting pipeline by switching on and off a valve. Or, in the case where the pressure relief mechanism is not damaged, the fire-fighting medium may always be accommodated in the fire-fighting pipeline, and the fire-fighting medium may also be used for adjusting the temperature of the battery cell. Temperature adjustment means heating or cooling a plurality of battery cells. In the case of cooling or lowering the temperature of the battery cells, the fire-fighting pipeline is configured to accommodate a cooling fluid to lower the temperature of the plurality of battery cells. In this case, the fire-fighting pipeline may also be called a cooling component, a cooling system or a cooling pipeline, etc. The fire-fighting medium accommodated by the fire-fighting pipeline may also be called a cooling medium or a cooling fluid, and more specifically, may be called a cooling liquid or a cooling gas. Optionally, the fire-fighting medium may flow in a circulating manner to achieve better temperature adjustment effects. Optionally, the fire-fighting medium may be water, a mixture of water and ethylene glycol, or air, etc.

When a battery is in a high-temperature and high-humidity environment, condensate is likely to be produced in a case of the battery, causing safety hazards and affecting the safety of the battery. Specifically, when a high-temperature and high-humidity gas in the battery encounters a component with lower temperature, such as a fire-fighting pipeline in the case of the battery, condensate will be produced. If the condensate drips into an electrical connection region in the battery, the safety of the battery may be affected.

In view of this, the present application provides a technical solution in which a condensing component is utilized to be attached to a thermal management component, and shield a through hole that communicates a gas inside and outside a case of a battery so as to condense a gas flowing into the inside of the case through the through hole. In this way, condensate can be enabled to be far away from an electrical connection region in the case. Therefore, the safety of the battery can be enhanced.

The thermal management component is configured to accommodate a fluid to adjust temperature of a plurality of battery cells. The fluid here may be a liquid or a gas, and temperature adjustment means heating or cooling the plurality of battery cells. In the case of cooling or lowering the temperature of the battery cells, the thermal management component is configured to accommodate a cooling fluid to lower the temperature of the plurality of battery cells. In this case, the thermal management component may also be called a cooling component, a cooling system or a cooling plate, etc. The fluid accommodated by the thermal management component may also be called a cooling medium or a cooling fluid, and more specifically, may be called a cooling liquid or a cooling gas. In addition, the thermal management component may also be configured for heating to raise the temperature of the plurality of battery cells, which is not limited by the embodiment of the present application. Optionally, the fluid may flow in a circulating manner to achieve better temperature adjustment effects. Optionally, the fluid may be water, a mixture of water and ethylene glycol, or air, etc.

The condensing component is attached to the thermal management component, and shields the through hole that communicates the gas inside and outside the case of the battery so as to condense the gas flowing into the inside of the case through the through hole. The condensing component may be made of a material with good thermal conductivity, such as metal. The condensing component may adopt various possible shapes and arrangements, as long as it can shield the through hole to condense the gas flowing into the inside of the case through the through hole.

The case of the battery is configured to accommodate the plurality of battery cells, a bus component and other components of the battery. In some embodiments, a structure configured to fix the battery cells may also be provided in the case. The shape of the case may be determined according to the plurality of battery cells accommodated therein. In some embodiments, the case may be a cube with six walls.

The bus component is configured to implement electrical connection between the plurality of battery cells, such as parallel connection, series connection or series-parallel connection, to form a higher voltage output. The bus component may implement the electrical connection between the battery cells by connecting electrode terminals of the battery cells. In some embodiments, the bus component may be fixed to the electrode terminals of the battery cells by means of welding. The electrical connection formed by the bus component may also be called "high-voltage connection".

In addition to the bus component, a sensing device configured to sense a state of the battery cell may further be provided in the battery. In an embodiment of the present application, the electrical connection in the battery may include electrical connection formed by the bus component and/or electrical connection in the sensing device.

A pressure balancing mechanism may further be disposed on the case of the battery and is configured to balance pressure inside and outside the case. For example, when the pressure inside the case is higher than that outside the case, the gas inside the case may flow into the outside of the case through the pressure balancing mechanism; and when the pressure inside the case is lower than that outside the case, the gas outside the case may flow into the inside of the case through the pressure balancing mechanism.

It should be understood that each component in the case of the battery described above should not be construed as a limitation to the embodiment of the present application, that is, the case for the battery according to the embodiment of the present application may or may not include the foregoing components.

The technical solutions described in the embodiments of the present application are all applicable to various devices using batteries, such as mobile phones, portable apparatuses, notebook computers, electromobiles, electronic toys, electric tools, electric vehicles, ships and spacecrafts. For example, the spacecrafts include airplanes, rockets, space shuttles, spaceships, etc.

It should be understood that the technical solutions described in the embodiments of the present application are not only applicable to the foregoing apparatuses, but also applicable to all apparatuses using batteries. However, for the sake of brevity, the following embodiments take electric vehicles as an example for description.

For example, as shown in FIG. 1, it is a schematic structural diagram of a vehicle 1 according to an embodiment of the present application. The vehicle 1 may be a fuel vehicle, a gas vehicle or a new-energy vehicle. The new-energy vehicle may be a full electric vehicle, a hybrid vehicle or an extended-range vehicle, or the like. A motor 40, a controller 30 and a battery 10 may be disposed inside the vehicle 1, and the controller 30 is configured to control the battery 10 to supply power to the motor 40. For example, the battery 10 may be disposed at the bottom or the head or the tail of the vehicle 1. The battery 10 may be configured to supply power to the vehicle 1. For example, the battery 10 can be used as an operation power supply of the vehicle 1 and is used for a circuit system of the vehicle 1, for example, for a working power demand of the vehicle 1 during startup, navigation and running. In another embodiment of the present application, the battery 10 may be used not only as an operating power source for the vehicle 1 but also as a driving power source for the vehicle 1, replacing or partially replacing fuel or natural gas to provide driving power for the vehicle 1.

In order to meet different power requirements, the battery 10 may include a plurality of battery cells 20, where the plurality of battery cells 20 may be in series connection, parallel connection or series-parallel connection. The series-parallel connection refers to a combination of series connection and parallel connection. The battery may also be called a battery pack. Optionally, the plurality of battery cells 20 may be first connected in series, in parallel or in series and parallel to form a battery module, and then a plurality of battery modules are connected in series, in parallel or in series and parallel to form a battery 10. That is, a plurality of battery cells 20 may directly form a battery 10, or may first form a battery module, and then battery modules form a battery 10.

Figure 2:
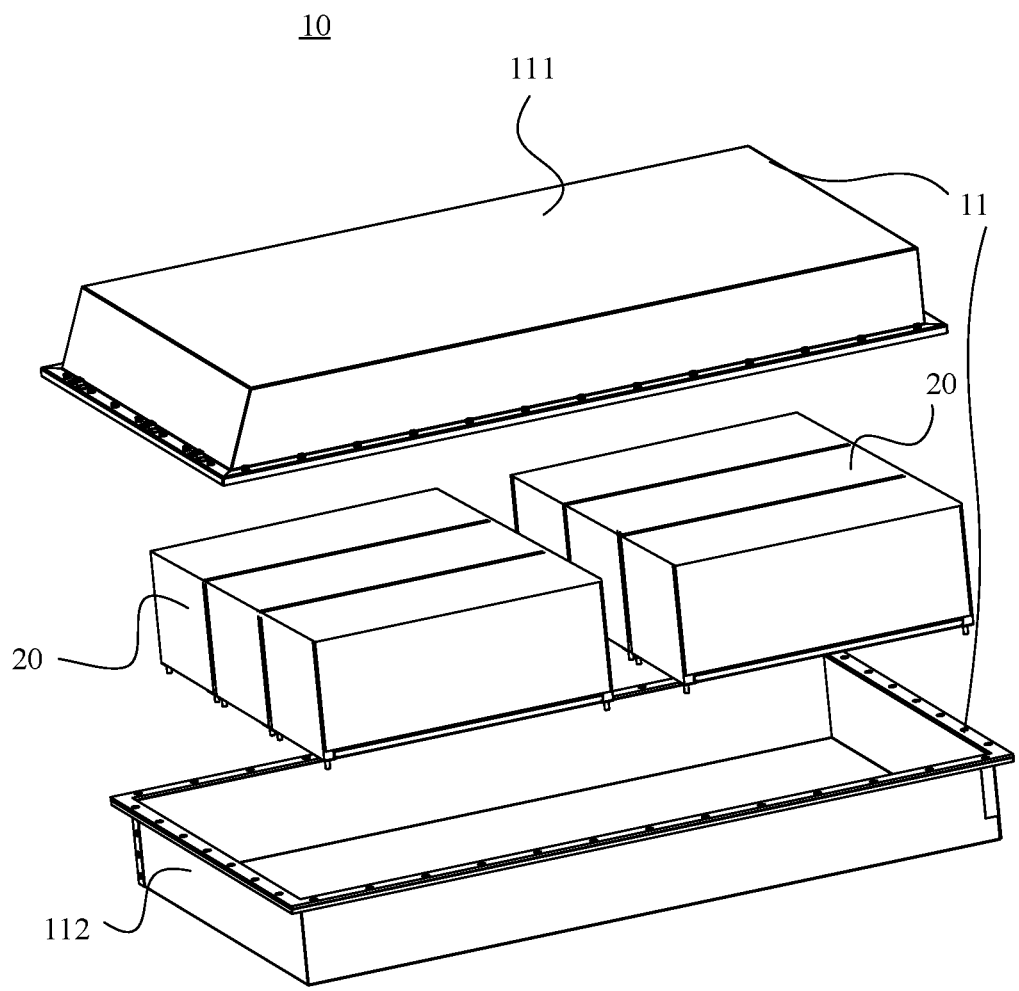
FIG. 2 is a schematic structural diagram of a battery according to an embodiment of the present application.

For example, as shown in FIG. 2, it is a schematic structural diagram of a battery 10 according to an embodiment of the present application. The battery 10 may include a plurality of battery cells 20. The battery 10 may further include a case 11 with a hollow structure inside, and the plurality of battery cells 20 are accommodated in the case 11. As shown in FIG. 2, the case may include two portions, which are referred to herein as a first portion 111 (an upper case) and a second portion 112 (a lower case), respectively, and the first portion 111 and the second portion 112 are fastened together. The shapes of the first portion 111 and the second portion 112 may be determined according to the shape of the combined plurality of battery cells 20, and the first portion 111 and the second portion 112 may each have an opening. For example, the first portion 111 and the second portion 112 each may be a hollow cuboid and each have only one surface with an opening, and the opening of the first portion 111 is disposed opposite to the opening of the second portion 112. The first portion 111 and the second portion 112 are fastened to each other to form the case 11 with a closed chamber. The plurality of battery cells 20 are combined in parallel connection or series connection or series-parallel connection and are then placed in the case 11 formed by fastening the first portion 111 to the second portion 112.

Optionally, the battery 10 may also include other structures, which will not be described in detail herein. For example, the battery 10 may also include a bus component. The bus component is configured to implement the electrical connection between the plurality of battery cells 20, such as parallel connection, series connection or series-parallel connection. Specifically, the bus component may implement the electrical connection between the battery cells 20 by connecting electrode terminals of the battery cells 20. Further, the bus component may be fixed to the electrode terminals of the battery cells 20 by means of welding. Electric energy of the plurality of battery cells 20 can be further led out through an electrically conductive mechanism passing through the case 11. Optionally, the electrically conductive mechanism may also belong to the bus component.

Figure 3:
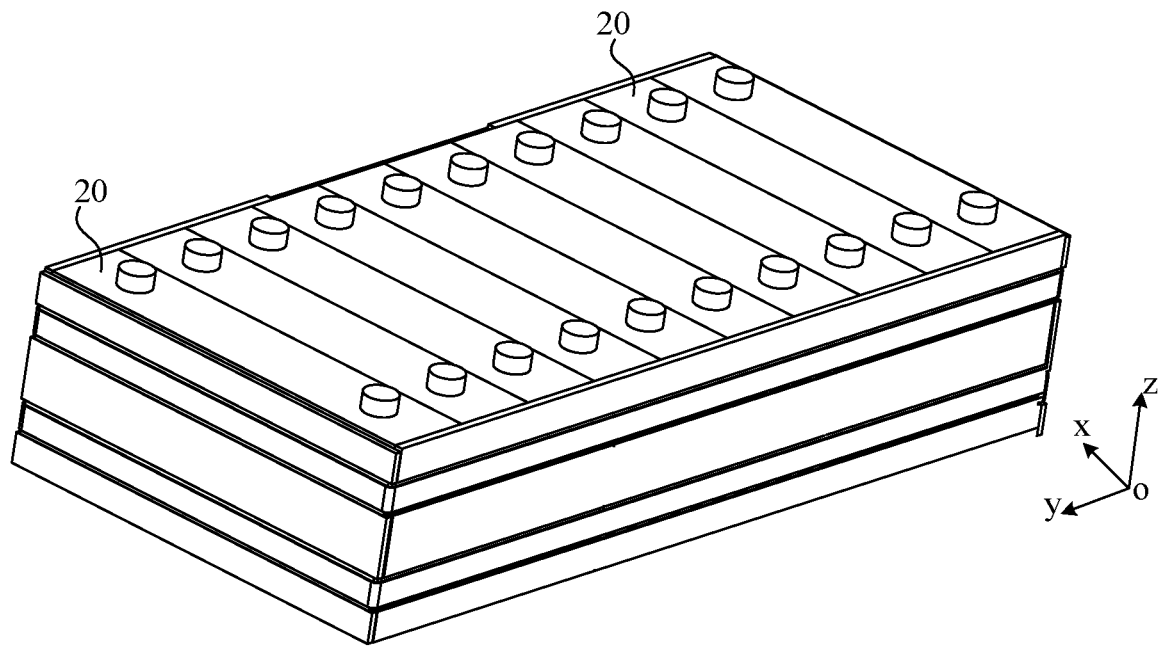
FIG. 3 is a schematic structural diagram of a battery module according to an embodiment of the present application.
Figure 4:
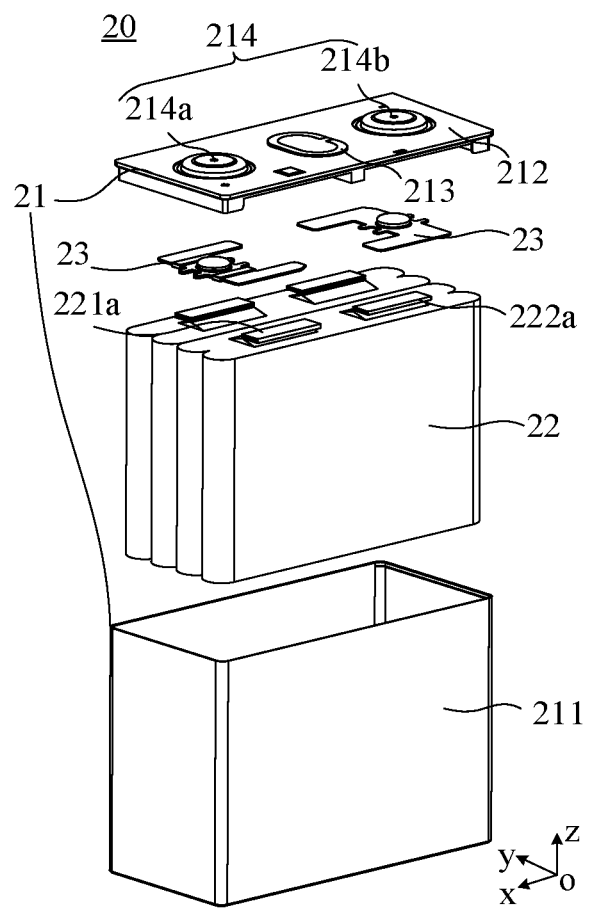
FIG. 4 is an exploded view of a battery cell according to an embodiment of the present application.

According to different power requirements, the number of the battery cells 20 may be set as any value. The plurality of battery cells 20 may be connected in series, in parallel or in series and parallel to implement larger capacity or power. Since there may be many battery cells 20 included in each battery 10, the battery cells 20 may be arranged in groups for convenience of installation, and each group of battery cells 20 constitutes a battery module. The number of the battery cells 20 included in the battery module is not limited and may be set as required. For example, FIG. 3 shows an example of a battery module. The battery may include a plurality of battery modules, and these battery modules may be connected in series, in parallel or in series and parallel. As shown in FIG. 4, it is a schematic structural diagram of a battery cell 20 according to an embodiment of the present application. The battery cell 20 includes one or more electrode assemblies 22, a housing 211 and a cover plate 212. The coordinate system shown in FIG. 4 is the same as that in FIG. 3. The housing 211 and the cover plate 212 form a shell or a battery box 21. A wall of the housing 211 and the cover plate 212 are both referred to as a wall of the battery cell 20. The housing 211 is shaped according to the combined shape of the one or more electrode assemblies 22. For example, the housing 211 may be a hollow cuboid or cube or cylinder, and one surface of the housing 211 has an opening such that the one or more electrode assemblies 22 can be placed in the housing 211. For example, when the housing 211 is a hollow cuboid or cube, one plane of the housing 211 is an opening surface, i.e., the plane does not have a wall, so that the inside and outside of the housing 211 are in communication with each other. When the housing 211 is a hollow cylinder, an end face of the housing 211 is an opening surface, i.e., the end face does not have a wall, so that the inside and outside of the housing 211 are in communication with each other. The cover plate 212 covers the opening and is connected to the housing 211 to form a closed cavity in which the electrode assembly 22 is placed. The housing 211 is filled with an electrolyte, such as an electrolytic solution.

The battery cell 20 may further include two electrode terminals 214, and the two electrode terminals 214 may be disposed on the cover plate 212. The cover plate 212 is generally in the shape of a flat plate, and the two electrode terminals 214 are fixed on a flat plate surface of the cover plate 212. The two electrode terminals 214 are a positive electrode terminal 214a and a negative electrode terminal 214b, respectively. Each electrode terminal 214 is correspondingly provided with a connecting member 23, or referred to as a current collecting member, which is located between the cover plate 212 and the electrode assembly 22, and configured to electrically connect the electrode assembly 22 and the electrode terminal 214.

As shown in FIG. 4, each electrode assembly 22 has a first electrode tab 221a and a second electrode tab 222a. The first electrode tab 221a and the second electrode tab 222a have opposite polarities. For example, when the first electrode tab 221a is a positive electrode tab, the second electrode tab 222a is a negative electrode tab. The first electrode tab 221a of the one or more electrode assemblies 22 is connected to one electrode terminal through one connecting member 23, and the second electrode tab 222a of the one or more electrode assemblies 22 is connected to the other electrode terminal through the other connecting member 23. For example, the positive electrode terminal 214a is connected to the positive electrode tab through one connecting member 23, and the negative electrode terminal 214b is connected to the negative electrode tab through the other connecting member 23.

In the battery cell 20, according to actual usage requirements, there may be a single or a plurality of electrode assemblies 22. As shown in FIG. 4, there are four independent electrode assemblies 22 in the battery cell 20.

A pressure relief mechanism 213 may also be disposed on the battery cell 20. The pressure relief mechanism 213 is configured to be actuated when an internal pressure or temperature of the battery cell 20 reaches a threshold, to relieve the internal pressure or temperature.

The pressure relief mechanism 213 may be in various possible pressure relief structures, which is not limited in the embodiment of the present application. For example, the pressure relief mechanism 213 may be a temperature-sensitive pressure relief mechanism configured to be capable of being melted when an internal temperature of the battery cell 20 provided with the pressure relief mechanism 213 reaches a threshold; and/or the pressure relief mechanism 213 may be a pressure-sensitive pressure relief mechanism configured to be capable of being fractured when an internal gas pressure of the battery cell 20 provided with the pressure relief mechanism 213 reaches a threshold.

Figure 5:
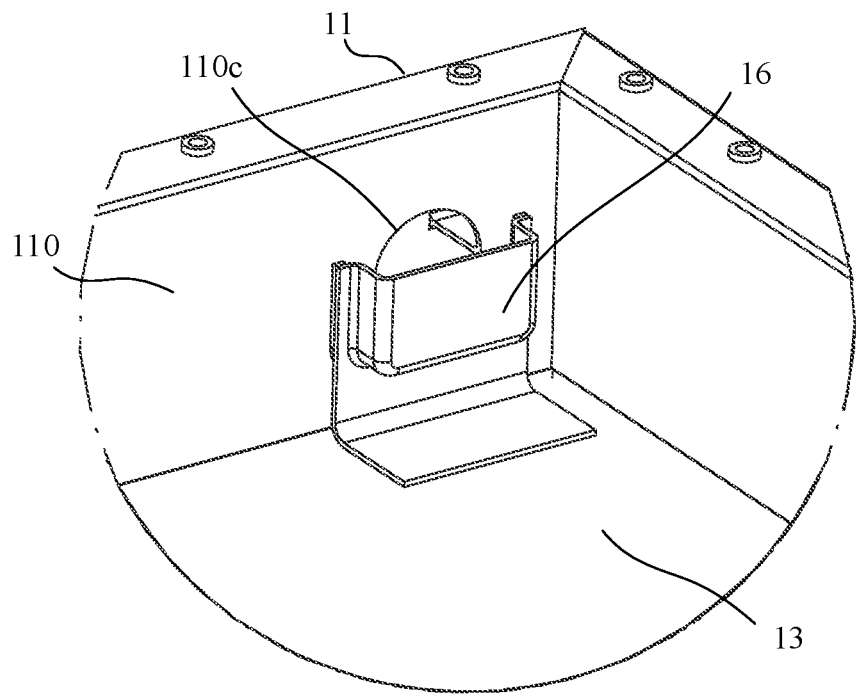
FIGS. 5-11 are schematic structural diagrams of a case according to some embodiments of the present application.

FIG. 5 is a schematic diagram of a case 11 for a battery according to an embodiment of the present application. As shown in FIG. 5, the case 11 may include a thermal management component 13, a first wall 110 and a condensing component 16.

The thermal management component 13 is configured to adjust temperature of battery cells 20 accommodated in the case 11. In the case of lowering the temperature of the battery cells 20, the thermal management component 13 may accommodate a cooling medium to adjust the temperature of the plurality of battery cells 20. In this case, the thermal management component 13 may also be called a cooling component, a cooling system or a cooling plate, etc. Optionally, a fluid accommodated in the thermal management component 13 may flow in a circulating manner to achieve a better temperature regulation effect. Optionally, the thermal management component 13 may be disposed at the bottom of the case 11.

The first wall 110 is provided with a through hole 110c, and the through hole 110c is configured to communicate a gas inside and outside the case 11. The first wall 110 may be any wall of the case 11. Optionally, as shown in FIG. 5, the first wall 110 may be a side wall of the case 11. For example, the side wall may be a side wall of the second portion 112 (the lower case) in FIG. 2. The through hole 110c may be configured to balance pressure inside and outside the case 11. For example, when the pressure inside the case 11 is higher than that outside the case 11, the gas inside the case 11 may flow into the outside of the case 11 through the through hole 110c; and when the pressure inside the case 11 is lower than that outside the case 11, the gas outside the case 11 may flow into the inside of the case 11 through the through hole 110c.

The condensing component 16 is attached to the thermal management component 13, and the condensing component 16 is configured to shield the through hole 110c so as to condense a gas flowing into the inside of the case 11 through the through hole 110c.

The condensing component 16 may be made of a material with good thermal conductivity, such as metal, which is not limited in the embodiment of the present application. The shape and arrangement of the condensing component 16 are not limited, as long as it can shield the through hole 110c to condense the gas flowing into the inside of the case 11 through the through hole 110c. The condensing component 16 may completely shield the through hole 110c, or may partially shield the through hole 110c.

Since the thermal management component 13 can maintain a lower temperature, the temperature of the condensing component 16 attached to the thermal management component 13 will be lower, so that the gas flowing from the outside of the case 11 into the inside of the case 11 through the through hole 110c is condensed by the condensing component 16, and condensate is enabled to be far away from an electrical connection region in the case 11, and the gas flowing into the inside of the case 11 is relatively dry and not easy to re-form condensate inside the case 11. Therefore, the safety of the battery 10 can be enhanced.

For example, if there is condensate at an electrical connection between the battery cells 20, that is, an electrical connection formed by a bus component, it may lead to a short circuit between high voltages and cause safety problems; or, if there is condensate at an electrical connection in a sensing device, it may lead to sensing failure of the sensing device, affect a battery management system and further may cause safety problems.

Therefore, in the embodiment of the present application, the condensing component 16 is utilized to be attached to the thermal management component 13, and shield the through hole 110c that communicates the gas inside and outside the case 11 so as to condense the gas flowing into the inside of the case 11 through the through hole 110c. In this way, condensate can be enabled to be far away from an electrical connection region in the case 11. Therefore, the safety of the battery 10 can be enhanced.

The technical solution of the embodiment of the present application can be applied to a battery 10 with a fire-fighting system. In order to improve the safety of the battery 10, a fire-fighting system may be included in the battery 10, and a fire-fighting pipeline of the fire-fighting system may be disposed on a wall (for example, a cover plate 212) of the battery cell 20 that is provided with a pressure relief mechanism 213. When the pressure relief mechanism 213 is actuated, the fire-fighting pipeline discharges a fire-fighting medium, thereby lowering temperature of emissions discharged from the pressure relief mechanism 213 and reducing the risk resulting from the emissions; and the fire-fighting medium may further flow into the inside of the battery cell 20 through the actuated pressure relief mechanism 213, thereby further lowering temperature of the battery cell 20 and enhancing the safety of the battery 10. Due to the low temperature of the fire-fighting pipeline, a high-temperature and high-humidity gas in the battery 10 may condense at the fire-fighting pipeline to produce condensate, which may drip to an electrical connection region in the battery 10 below, thereby affecting the safety of the battery 10.

It should be understood that the above scenario with a fire-fighting system is only one possible application scenario of the embodiment of the present application, and the embodiment of the present application is not limited to this.

Optionally, in an embodiment of the present application, the condensing component 16 may be disposed on an inner surface of the case 11.

For example, in the case where the thermal management component 13 intersects with the first wall 110, a first portion of the condensing component 16 extends along the thermal management component 13 to be attached to the thermal management component 13, and a second portion of the condensing component 16 extends along the first wall 110 to shield the through hole 110c.

Figure 6:
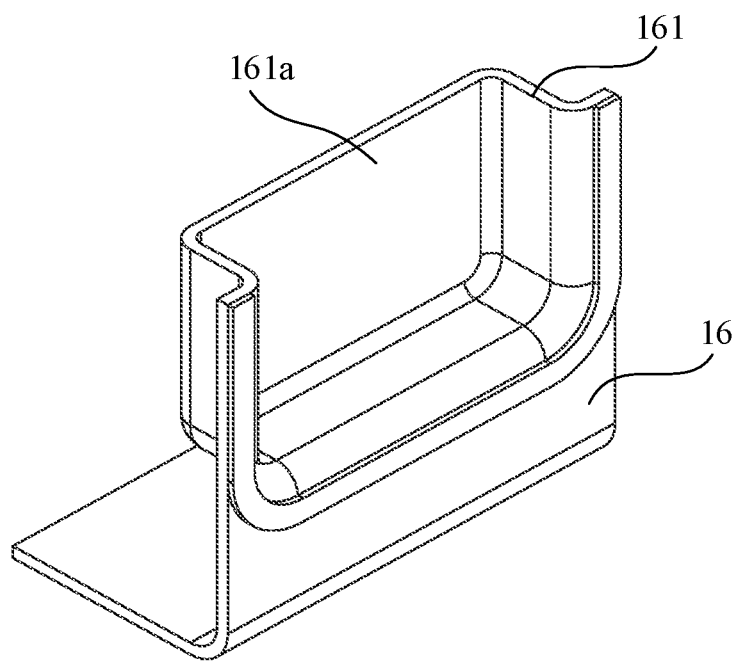

Optionally, in an embodiment of the present application, as shown in FIG. 5 or FIG. 6, the condensing component 16 may include a cover-like structure 161, and the cover-like structure 161 shields the through hole 110c.

Optionally, the cover-like structure 161 may be attached to a region of the first wall 110 around the through hole 110c, and have a first opening 161a for the gas to flow into the case 11. The first opening 161a may be disposed in a first direction of the cover-like structure 161, and the first direction is an opposite direction of a gravity direction, that is, an upward direction in FIG. 6.

By shielding the through hole 110c by the cover-like structure 161, the gas reaching the through hole 110c can be condensed by the cover-like structure 161, thereby improving the condensation effect. The condensed gas can enter the inside of the case 11 through the first opening 161a of the cover-like structure to maintain balance of pressure inside and outside the case 11.

Optionally, the cover-like structure 161 may completely shield the through hole 110c, or may partially shield the through hole 110c. For example, an upper edge of the cover-like structure 161 may be higher than the highest point of the through hole 110c to completely shield the through hole 110c, or an upper edge of the cover-like structure 161 may not be higher than the highest point of the through hole 110c to partially shield the through hole 110c.

Optionally, in an embodiment of the present application, the first opening 161a corresponds to a connection of a pipeline of a fire-fighting system in the case 11, and the first opening 161a is further configured to collect a fluid leaked at the connection when the fluid is leaked at the connection.

When a fire-fighting system is disposed in the case 11, a fluid may be leaked at a connection of a pipeline (a fire-fighting pipeline) of the fire-fighting system. In this case, the condensing component 16 may be disposed at a location below the connection of the fire-fighting pipeline, so that the first opening 161a corresponds to the connection of the fire-fighting pipeline. In this way, if a fluid is leaked at the connection, the leaked fluid can also drop into the cover-like structure 161 through the first opening 161a and be collected.

If a fluid is leaked at the connection of the fire-fighting pipeline, and the leaked fluid is not collected, it spreads in the case 11, and continues to evaporate and condense, which causes safety hazards. By adopting the solution of the embodiment of the present application, an occurrence of the safety hazards can be reduced.

Optionally, the cover-like structure 161 may be hemispherical or square, which is not limited in the embodiment of the present application, as long as it can realize a function in the embodiment of the present application.

Figure 7:
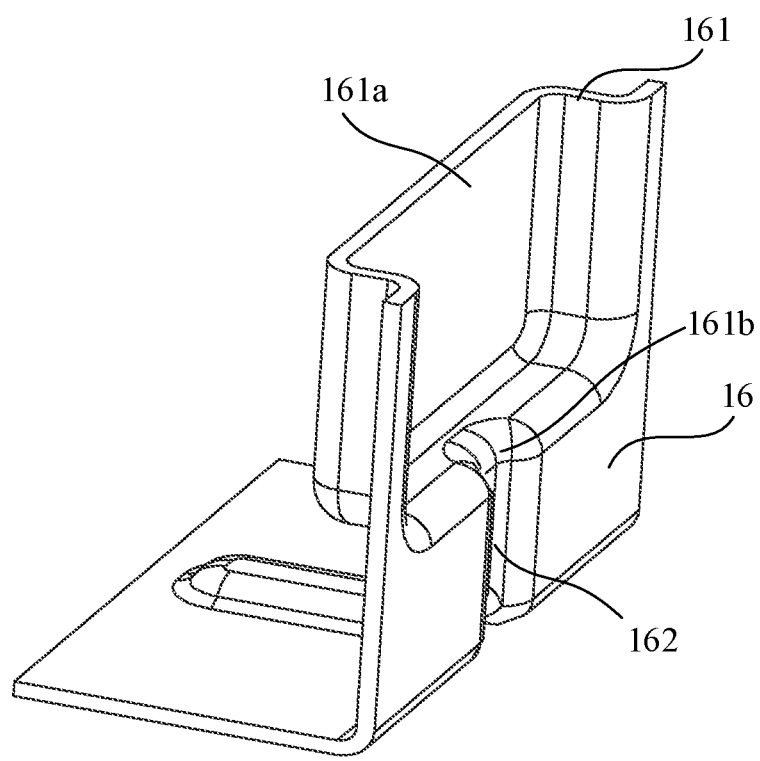

Optionally, in an embodiment of the present application, as shown in FIG. 7, the condensing component 16 further includes a flow channel 162, and the flow channel 162 is configured to guide condensate in the cover-like structure 161 to the thermal management component 13. Portions of the condensing component 16 on both sides of the flow channel 162 are attached to the thermal management component 13 or the first wall 110 to ensure the sealing between the condensing component 16 and the thermal management component 13 or the first wall 110.

The cover-like structure 161 has a second opening 161b corresponding to the flow channel 162, and the second opening 161b is configured to guide the condensate in the cover-like structure 161 to the flow channel 162. The second opening 161b is disposed in a second direction of the cover-like structure 161, and the second direction is a gravity direction, that is, a downward direction in FIG. 7.

Figure 8:
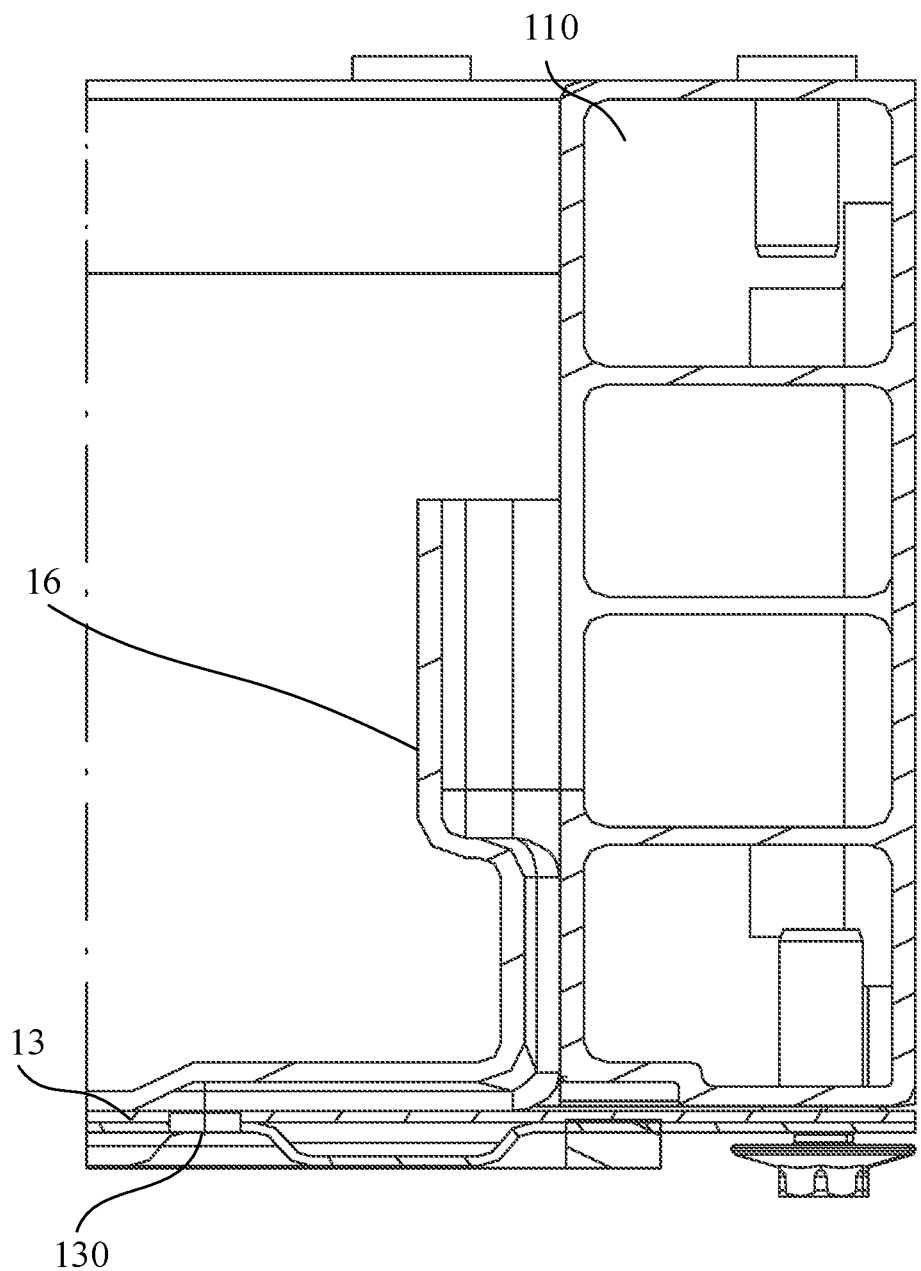

Optionally, in an embodiment of the present application, as shown in FIG. 8, a one-way gravity valve 130 may be disposed on the thermal management component 13, and the one-way gravity valve 130 is configured to discharge the condensate in the flow channel 162 from the case 11 when the gravity of the condensate in the flow channel 162 reaches a threshold.

The one-way gravity valve 130 is switched on when the gravity of a liquid in the flow channel 162 reaches a threshold, and discharges the liquid downward, while external gas cannot enter the flow channel 162 in the reverse direction. Optionally, the flow channel 162 may be set to have a longer length in the gravity direction to match the gravity when the one-way gravity valve 130 is switched on.

Through the cover-like structure 161 and the flow channel 162, the condensate or the fluid leaked at the connection of the fire-fighting pipeline can be guided to the thermal management component 13. Further, through the one-way gravity valve 130, when there are a lot of condensate or leaked fluids, they can be discharged from the case 11, so as to ensure the safety of the battery 10.

Optionally, the condensing component 16 may be attached to the thermal management component 13 or the first wall 110a through a sealing material or by means of welding. The sealing material may be a thermally conductive sealing material.

It should be understood that the condensing component 16 may also be attached to the thermal management component 13 or the first wall 110 in other ways and/or at other positions. The embodiment of the present application is not limited to this, as long as it can realize a function in the embodiment of the present application.

Optionally, in an embodiment of the present application, the case 11 may further include: a pressure balancing mechanism 17 configured to balance pressure inside and outside the case 11. For example, when the pressure inside the case 11 is higher than that outside the case 11, the gas inside the case 11 may flow into the outside of the case 11 through the pressure balancing mechanism 17; and when the pressure inside the case 11 is lower than that outside the case 11, the gas outside the case 11 may flow into the inside of the case 11 through the pressure balancing mechanism 17. Optionally, when the first wall 110 is a single-layer wall, the pressure balancing mechanism 17 may be disposed in the through hole 110c; and when the first wall 110 is a multi-layer wall, the pressure balancing mechanism 17 and the through hole 110c may be respectively disposed on different layers of sub-walls.

Figure 9:
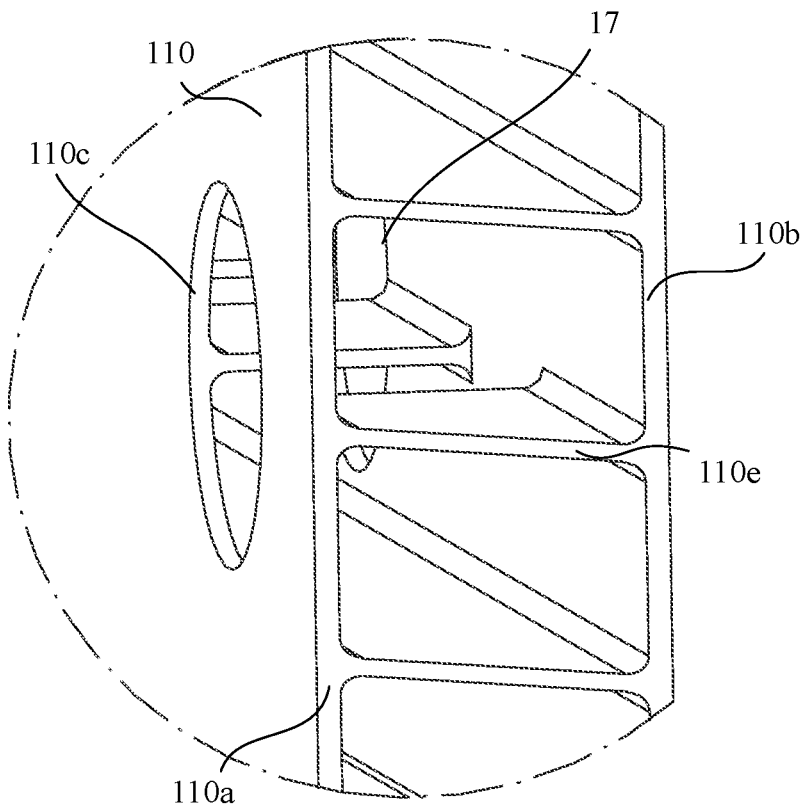

Optionally, in an embodiment of the present application, as shown in FIG. 9, the first wall 110 may include a first sub-wall 110a and a second sub-wall 110b, where a cavity is formed between the first sub-wall 110a and the second sub-wall 110b, the first sub-wall 110a is an inner wall of the case 11, the second sub-wall 110b is an outer wall of the case 11, and the through hole 110c is disposed on the first sub-wall 110a.

In this case, a pressure balancing mechanism 17 may be disposed on the second sub-wall 110b, and a gas flowing into the cavity from the outside of the case 11 through the pressure balancing mechanism 17 flows into the inside of the case 11 through the through hole 110c. The first wall 110 may be configured to condense the gas flowing into the cavity through the pressure balancing mechanism 17 in the cavity.

When the first wall 110 adopts a multi-layer wall arrangement, the multi-layer wall may form a cavity. For example, the first sub-wall 110a and the second sub-wall 110b in FIG. 9 may form a cavity. In this way, after the gas outside the case 11 enters the cavity, it can condense in the cavity to form condensate in the cavity; moreover, due to the existence of the cavity, gas condensing space is enlarged and a condensation effect is further improved.

Optionally, as another embodiment of the present application, the condensate or the leaked fluid may also be guided to the cavity in the first wall 110 to avoid accumulation in the inside of the case 11. For example, a through hole on the first sub-wall 110a may be used. The through hole is set at a location lower than the cover-like structure 161, and the condensate or the leaked fluid is guided to the through hole through the flow channel to be discharged into the cavity. Further, a one-way gravity valve may also be disposed at the bottom of the cavity to discharge the condensate or the leaked fluids to the outside of the case 11 when there are a lot of the condensate or leaked fluids.

Optionally, as shown in FIG. 9, in addition to the first sub-wall 110a and the second sub-wall 110b, the first wall 110 may further include a third sub-wall 110e connecting the first sub-wall 110a and the second sub-wall 110b. The embodiment of the present application is not limited thereto.

Optionally, in an embodiment of the present application, an axis of the through hole 110c does not overlap with an axis of the pressure balancing mechanism 17. Optionally, an orthographic projection of the through hole 110c on the second sub-wall 110b does not overlap with the pressure balancing mechanism 17.

Figure 10:
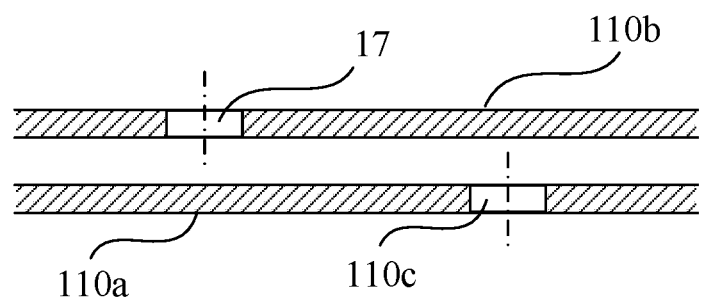

As shown in FIGS. 9 and 10, the through hole 110c and the pressure balancing mechanism 17 are respectively located on the first sub-wall 110a and the second sub-wall 110b, and do not directly face each other. In a case where the through hole 110c and the pressure balancing mechanism 17 directly face each other, after the external gas enters the cavity through the pressure balancing mechanism 17, it will quickly enter the inside of the case 11 through the through hole 110c, which may affect the condensation effect on the gas. In the embodiment of the present application, staggered arrangement of the through hole 110c and the pressure balancing mechanism 17 can extend the channel of the gas in the cavity and improve the condensation effect on the gas.

Figure 11:
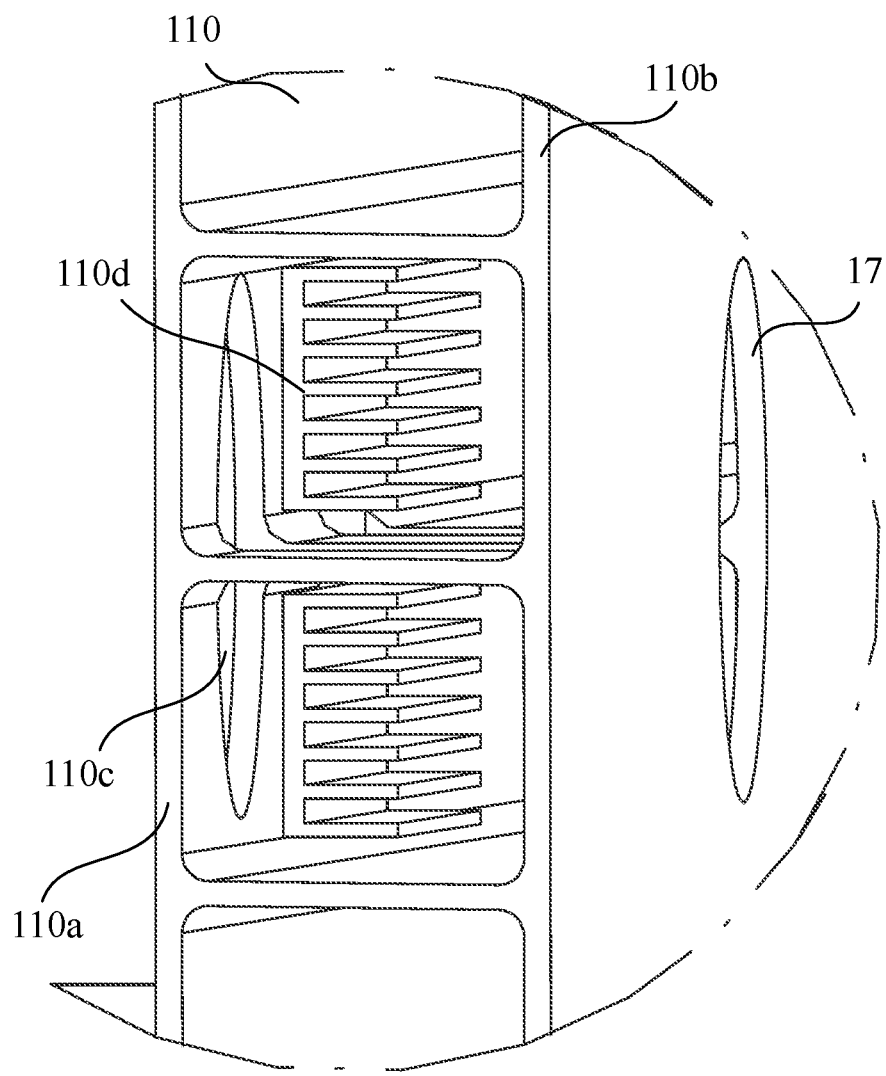

Optionally, in an embodiment of the present application, as shown in FIG. 11, fin 110d may be further disposed in the cavity, and the fin 110d are configured to condense the gas flowing into the cavity through the pressure balancing mechanism 17.

By disposing the fins 110d, a condensation area of the gas can be enlarged, thereby improving the condensation effect on the gas.

The fin 110d may be disposed in a gas channel from the pressure balancing mechanism 17 to the through hole 110c. In this way, when the gas flows from the pressure balancing mechanism 17 to the through hole 110c, it will contact the fin 110d and be condensed by the fin 110d, thereby improving the condensation effect.

The fin 110d may be fixed on the first sub-wall 110a. The fixing method may be bonding, welding, bolting, etc., which is not limited in the embodiment of the present application. When the fixing method is bolting, the fin 110d makes bolt avoidance and hole opening.

Optionally, the fin 110d may be parallel to a connecting line from a center of the pressure balancing mechanism 17 to a center of the through hole 110c. In this way, not only can the condensation effect of the fin 110d be achieved, but also the fin 110d can be used to guide air flow without obstructing the flow of the gas, so as to ensure balance of the pressure inside and outside the case 11.

An embodiment of the present application further provides a battery 10, and the battery 10 may include a plurality of battery cells 20 and the case 11 described in each of the foregoing embodiments, where the plurality of battery cells 20 are accommodated in the case 11.

Optionally, the battery 10 may also include other battery components, for example, a bus component, a sensing device, a fire-fighting system, etc., which is not limited in the embodiment of the present application.

Figure 12:
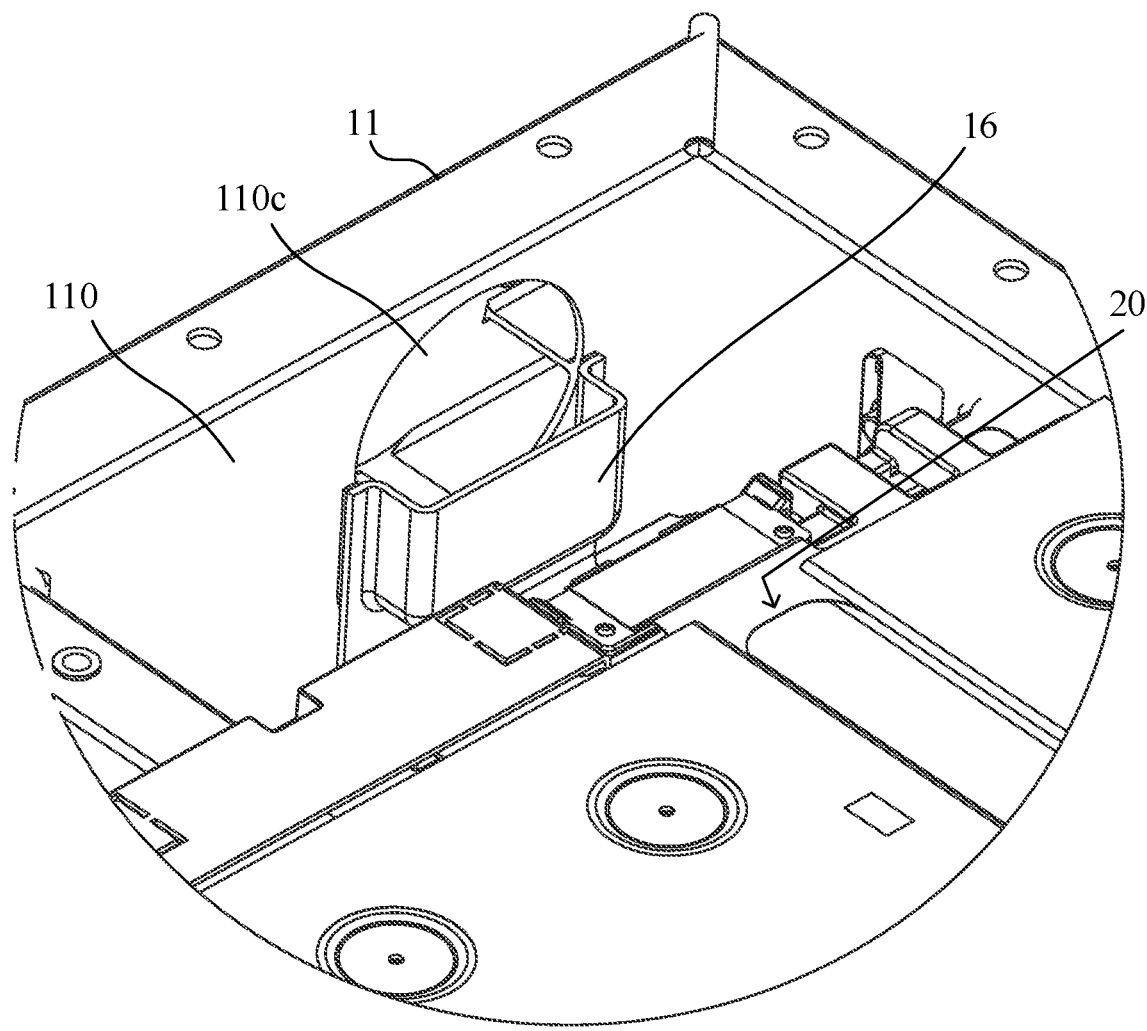
FIG. 12 is a schematic partial structural diagram of a battery according to an embodiment of the present application.

FIG. 12 is a schematic partial structural diagram of a battery 10 according to an embodiment of the present application. As shown in FIG. 12, the battery 10 may include a case 11 and a plurality of battery cells 20.

The case 11 may be the case 11 described in each of the foregoing embodiments. For example, the case 11 includes a condensing component 16 attached to a thermal management component 13, and the condensing component 16 is configured to shield a through hole 110c so as to condense a gas flowing into the inside of the case 11 through the through hole 110c.

The battery cell 20 may be the battery cell 20 described in each of the foregoing embodiments. For example, the battery cell 20 may be the battery cell 20 in FIG. 4.

The battery 10 may further include a bus component configured to implement electrical connection of the plurality of battery cells 20. The battery 10 may further include a sensing device configured to sense a state of the battery cell 20. The bus component and the sensing device may be disposed above the battery cell 20.

A cover plate of the battery cell 20 may be provided with a pressure relief mechanism 213 configured to be actuated when an internal pressure or temperature of the battery cell 20 reaches a threshold, to relieve the internal pressure. A fire-fighting pipeline may further be disposed on the pressure relief mechanism 213 to discharge a fire-fighting medium when the pressure relief mechanism 213 is actuated, so as to lower temperature of emissions discharged from the pressure relief mechanism and to lower temperature of the battery cell 20.

A pressure balancing mechanism 17 may further be disposed on the first wall 110 to balance pressure inside and outside the case 11. When the pressure balancing mechanism 17 balances the pressure inside and outside the case 11, a gas flows into the inside of the case 11 through the through hole 110c. As described in each of the foregoing embodiments, the gas is condensed while flowing into the inside of the case 11, so that the gas flowing into the inside of the case 11 is relatively dry and not easy to re-form condensate inside the case 11, thereby avoiding safety problems resulted from the fact that an electrical connection region in the case 11, for example, an electrical connection region of the bus component or the sensing device, is affected by the condensate.

For the specific description of each component in the battery 10, reference can be made to each of the foregoing embodiments, which will not be repeated here for brevity.

An embodiment of the present application further provides a power consumption device, which may include the battery 10 in each of the foregoing embodiments. Optionally, the power consumption device may be a vehicle 1, a ship or a spacecraft.

A case for a battery, a battery and a power consumption device according to embodiments of the present application are described above, and a method and device for producing a battery according to embodiments of the present application will be described below. For parts not described in detail, reference can be made to each of the foregoing embodiments.

Figure 13:
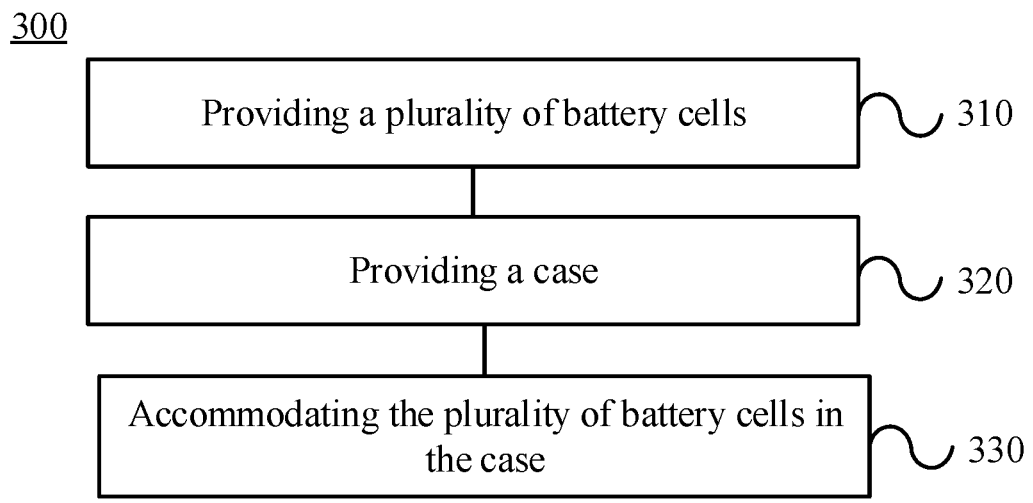
FIG. 13 is a schematic flowchart of a method for producing a battery according to an embodiment of the present application.

FIG. 13 shows a schematic flowchart of a method 300 for producing a battery according to an embodiment of the present application. As shown in FIG. 13, the method 300 may include:

310, providing a plurality of battery cells 20;

320, providing a case 11, the case 11 including:

a thermal management component 13 configured to adjust temperature of the battery cell 20 accommodated in the case 11;

a first wall 110 provided with a through hole 110c, the through hole 110c being configured to communicate a gas inside and outside the case 11; and a condensing component 16 attached to the thermal management component 13, the condensing component 16 being configured to shield the through hole 110c so as to condense a gas flowing into the inside of the case 11 through the through hole 110c; and 330, accommodating the plurality of battery cells 20 in the case 11.

Figure 14:
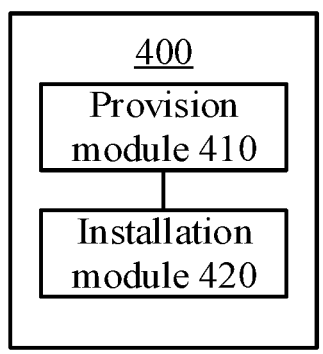
FIG. 14 is a schematic block diagram of a device for producing a battery according to an embodiment of the present application.

FIG. 14 shows a schematic block diagram of a device 400 for producing a battery according to an embodiment of the present application. As shown in FIG. 14, the device 400 for producing the battery may include: a provision module 410 and an installation module 420.

The provision module 410 is configured to: provide a plurality of battery cells 20; provide a case 11, the case 11 including: a thermal management component 13 configured to adjust temperature of the battery cell 20 accommodated in the case 11; a first wall 110 provided with a through hole 110c, the through hole 110c being configured to communicate a gas inside and outside the case 11; and a condensing component 16 attached to the thermal management component 13, the condensing component 16 being configured to shield the through hole 110c so as to condense a gas flowing into the inside of the case 11 through the through hole 110c.

The installation module 420 is configured to accommodate the plurality of battery cells 20 in the case 11.

Finally, it should be noted that the above embodiments are merely used for illustrating rather than limiting the technical solutions of the present application. Although the present application is illustrated in detail with reference to the foregoing embodiments, those of ordinary skill in the art should understand that they can still modify the technical solutions described in each of the foregoing embodiments, or make equivalent substitutions to some of technical features therein, but these modifications or substitutions do not make the nature of the respective technical solutions depart from the spirit and scope of the technical solutions of the embodiments of the present application.

What is claimed is:

1. A case for a battery, comprising:
    a thermal management component configured to accommodate a fluid to adjust temperature of a battery cell accommodated in the case;
    a first wall provided with a through hole, the through hole being configured to communicate a gas inside and outside the case; and
    a condensing component attached to the thermal management component, the condensing component being configured to shield the through hole so as to condense a gas flowing into the inside of the case through the through hole;
    wherein the condensing component is disposed on an inner surface of the case, wherein the condensing component comprises a cover-shaped structure, and the cover-shaped structure shields the through hole, wherein the condensing component further comprises a flow channel, and the flow channel is configured to guide condensate in the cover-shaped structure to the thermal management component, wherein the cover-shaped structure has a second opening corresponding to the flow channel, and the second opening is configured to guide the condensate in the cover-shaped structure to the flow channel.

2. The case according to claim 1, wherein the cover-shaped structure is attached to a region of the first wall around the through hole, and has a first opening for the gas to flow into the case.

3. The case according to claim 2, wherein the first opening is disposed in a first direction of the cover-shaped structure, and the first direction is an opposite direction of a gravity direction.

4. The case according to claim 2, wherein the first opening corresponds to a connection of a pipeline of a fire-fighting system in the case, and the first opening is further configured to collect a fluid leaked at the connection when the fluid is leaked at the connection.

5. The case according to claim 1, wherein portions of the condensing component on both sides of the flow channel are attached to the thermal management component or the first wall.

6. The case according to claim 1, wherein the second opening is disposed in a second direction of the cover-shaped structure, and the second direction is a gravity direction.

7. The case according to claim 1, wherein a one-way gravity valve is disposed on the thermal management component, and the one-way gravity valve is configured to discharge the condensate in the flow channel from the case when the gravity of the condensate in the flow channel reaches a threshold.

8. The case according to claim 1, wherein the case further comprises:
a pressure balancing mechanism configured to balance pressure inside and outside the case.

9. The case according to claim 8, wherein the first wall comprises a first sub-wall and a second sub-wall, wherein a cavity is formed between the first sub-wall and the second sub-wall, the first sub-wall is an inner wall of the case, the second sub-wall is an outer wall of the case, and the through hole is disposed on the first sub-wall, wherein the pressure balancing mechanism is disposed on the second sub-wall, and a gas flowing into the cavity from the outside of the case through the pressure balancing mechanism flows into the inside of the case through the through hole, wherein the first wall is configured to condense the gas flowing into the cavity through the pressure balancing mechanism in the cavity.

10. The case according to claim 9, wherein an axis of the through hole does not overlap with an axis of the pressure balancing mechanism.

11. The case according to claim 10, wherein an orthographic projection of the through hole on the second sub-wall does not overlap with the pressure balancing mechanism.

12. The case according to claim 9, wherein a fin is disposed in the cavity, and the fin is configured to condense the gas flowing into the cavity through the pressure balancing mechanism.

13. The case according to claim 12, wherein the fin is disposed in a gas channel from the pressure balancing mechanism to the through hole, wherein the fin is fixed on the first sub-wall, wherein the fin is parallel to a connecting line from a center of the pressure balancing mechanism to a center of the through hole.

14. The case according to claim 1, wherein the thermal management component intersects with the first wall, a first portion of the condensing component extends along the thermal management component to be attached to the thermal management component, and a second portion of the condensing component extends along the first wall to shield the through hole.

15. A battery comprising:
a plurality of battery cells; and
a case, wherein the plurality of battery cells are accommodated in the case, and the case comprises:
a thermal management component configured to accommodate a fluid to adjust temperature of at least a battery cell of the plurality of battery cells accommodated in the case;
a first wall provided with a through hole, the through hole being configured to communicate a gas inside and outside the case; and
a condensing component attached to the thermal management component, the condensing component being configured to shield the through hole so as to condense a gas flowing into the inside of the case through the through hole;
wherein the condensing component is disposed on an inner surface of the case, wherein the condensing component comprises a cover-shaped structure, and the cover-shaped structure shields the through hole, wherein the condensing component further comprises a flow channel, and the flow channel is configured to guide condensate in the cover-shaped structure to the thermal management component, wherein the cover-shaped structure has a second opening corresponding to the flow channel, and the second opening is configured to guide the condensate in the cover-shaped structure to the flow channel.

16. A power consumption device comprising: a battery, wherein the battery comprises:
a plurality of battery cells; and
a case wherein the plurality of battery cells are accommodated in the case, and the case comprises:
a thermal management component configured to accommodate a fluid to adjust temperature of at least a battery cell of the plurality of battery cells accommodated in the case;
a first wall provided with a through hole, the through hole being configured to communicate a gas inside and outside the case; and
a condensing component attached to the thermal management component, the condensing component being configured to shield the through hole so as to condense a gas flowing into the inside of the case through the through hole;
wherein the condensing component is disposed on an inner surface of the case, wherein the condensing component comprises a cover-shaped structure, and the cover-shaped structure shields the through hole, wherein the condensing component further comprises a flow channel, and the flow channel is configured to guide condensate in the cover-shaped structure to the thermal management component, wherein the cover-shaped structure has a second opening corresponding to the flow channel, and the second opening is configured to guide the condensate in the cover-shaped structure to the flow channel.

* * * * *